US008151560B2

(12) United States Patent
Zanini-Fisher et al.

(10) Patent No.: US 8,151,560 B2
(45) Date of Patent: Apr. 10, 2012

(54) SYSTEM AND METHOD FOR MONITORING PARTICULATE FILTER PERFORMANCE

(75) Inventors: Margherita Zanini-Fisher, Bloomfield Hills, MI (US); Michiel J. van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1272 days.

(21) Appl. No.: 11/295,785

(22) Filed: Dec. 6, 2005

(65) Prior Publication Data
US 2007/0125075 A1 Jun. 7, 2007

(51) Int. Cl.
*F01N 3/00* (2006.01)

(52) U.S. Cl. .......... 60/297; 60/274; 60/276; 60/277; 60/295; 55/DIG. 30; 55/283; 55/466

(58) Field of Classification Search .......... 60/274, 60/276, 277, 295, 297, 311; 55/DIG. 30, 55/283, 466
See application file for complete search history.

(56) References Cited

U.S. PATENT DOCUMENTS

| | | | |
|---|---|---|---|
| 5,651,248 A * | 7/1997 | Kawamura | 60/286 |
| 6,192,740 B1 | 2/2001 | Thomas et al. | |
| 6,432,168 B2 | 8/2002 | Schonauer | |
| 6,907,873 B2 * | 6/2005 | Hamahata | 123/676 |
| 6,971,258 B2 * | 12/2005 | Rhodes et al. | 73/28.01 |
| 7,051,519 B2 * | 5/2006 | Kuboshima et al. | 60/286 |
| 7,147,688 B2 * | 12/2006 | Kondou et al. | 95/1 |
| 7,159,392 B2 * | 1/2007 | Kondoh et al. | 60/297 |
| 7,272,926 B2 * | 9/2007 | Kosaka | 60/295 |
| 7,278,304 B2 | 10/2007 | Zanini-Fisher et al. | |
| 7,334,401 B2 * | 2/2008 | Cheng | 60/297 |
| 7,357,822 B2 * | 4/2008 | Hamahata et al. | 55/283 |
| 7,458,206 B2 * | 12/2008 | Yahata et al. | 60/297 |
| 7,587,925 B2 * | 9/2009 | Wirth et al. | 73/1.02 |
| 7,677,029 B2 * | 3/2010 | Matsuno et al. | 60/295 |
| 2001/0035044 A1 | 11/2001 | Larsson et al. | |
| 2007/0089399 A1 * | 4/2007 | Rhodes et al. | 60/278 |

FOREIGN PATENT DOCUMENTS

EP 1291514 A2 5/2002

OTHER PUBLICATIONS

G.W. Schweimer, "Ion Probe in the Exhaust Manifold of Diesel Enginges", S.A.E. 860012, pp. 55-58.
N. Collings, et al., "Real-Time Smoke Sensor for Diesel Engines", S.A.E. 860157, 5 Pgs.

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

In an apparatus having an internal combustion engine, an exhaust system for transporting engine exhaust from the engine is described. In one example, a particulate filter disposed in the exhaust system is assessed for degradation. The approach may be particularly useful for an image charge sensor.

11 Claims, 8 Drawing Sheets

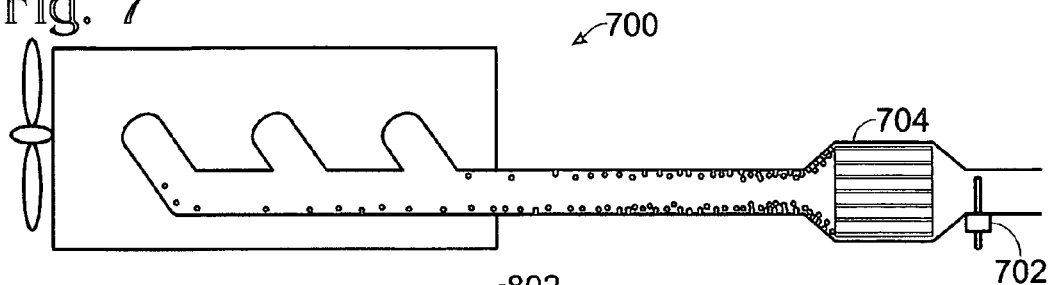
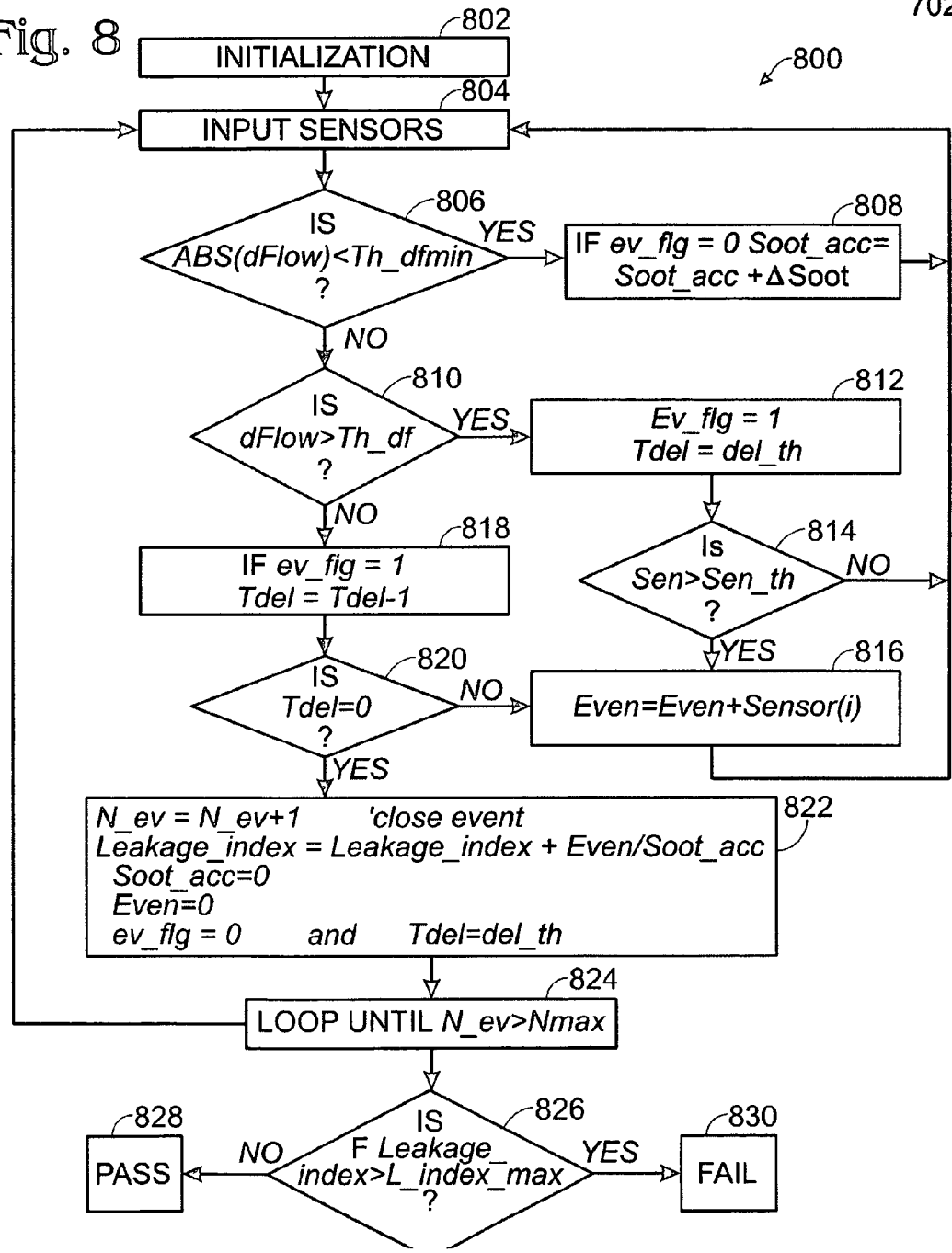

SYSTEM AND METHOD FOR MONITORING PARTICULATE FILTER PERFORMANCE

TECHNICAL FIELD

The present application relates to the field of automotive emission control systems and methods.

BACKGROUND AND SUMMARY

Particulate matter filters are increasingly used in automotive emissions systems for reducing particulate concentrations in engine exhaust. However, over time, such filters can suffer irreversible decreases in trapping efficiencies as the filter develops cracks due to uncontrolled temperature excursion during the filter regeneration process, by means of which the soot accumulated in the filter is burned off under controlled engine operating conditions. Losses in trapping efficiency may result in increased particulate matter emissions well above the regulated limit.

Increasingly stringent particulate matter emissions standards and proposed government-mandated on-board diagnostic (OBD) requirements for monitoring the trapping efficiency of a particulate filter have stimulated much research into new techniques for monitoring particulate filter performance. Currently, only laboratory grade instruments are available for particulate matter measurements. Such instruments typically measure particulate concentrations via optical, gravimetric or electrical methods. These instruments typically require controlled operating conditions and extensive calibration for proper functioning. Furthermore, some of these instruments, such as instruments that utilize optical measurement techniques, may require periodic cleaning. Therefore, these instruments may be too expensive and difficult to use under normal automobile operating conditions to be a practical solution to monitoring particulate emissions in automobiles. Furthermore, other methods for detecting a particulate filter failure, such as the differential pressure method in which a pressure differential across the filter is monitored, may not be suitable for detecting a failure of the filter due to interference effects from ash loading in the filter.

The inventors herein have realized that the performance of a particulate filter may be efficiently and effectively monitored by performing, in an apparatus having an internal combustion engine, an exhaust system for transporting engine exhaust from the engine, a particulate filter disposed in the exhaust system, and a particulate detector disposed downstream of the particulate filter in the exhaust system, a method for monitoring a performance characteristic of the particulate filter, including detecting an increase in exhaust flow in the exhaust system; determining if the increase in the exhaust flow occurs at a rate equal to or greater than a threshold rate of change; and if the increase in the exhaust flow is determined to have occurred at a rate equal to or greater than the threshold rate of change, then determining from a signal received from the particulate detector if a value of a parameter related to particulate matter passing through the particulate filter has a predetermined relationship to a predetermined threshold value that indicates a reduction in filter trapping efficiency. In some embodiments, the particulate sensor may include an image charge sensor.

BRIEF DESCRIPTION OF THE DRAWINGS

FIG. 7 shows a schematic view of another exemplary embodiment of a diesel engine.

FIG. 8 shows a flow diagram of another exemplary embodiment of a method of monitoring a performance of a particulate filter.

DETAILED DESCRIPTION OF THE DEPICTED EMBODIMENTS

Figure 1:
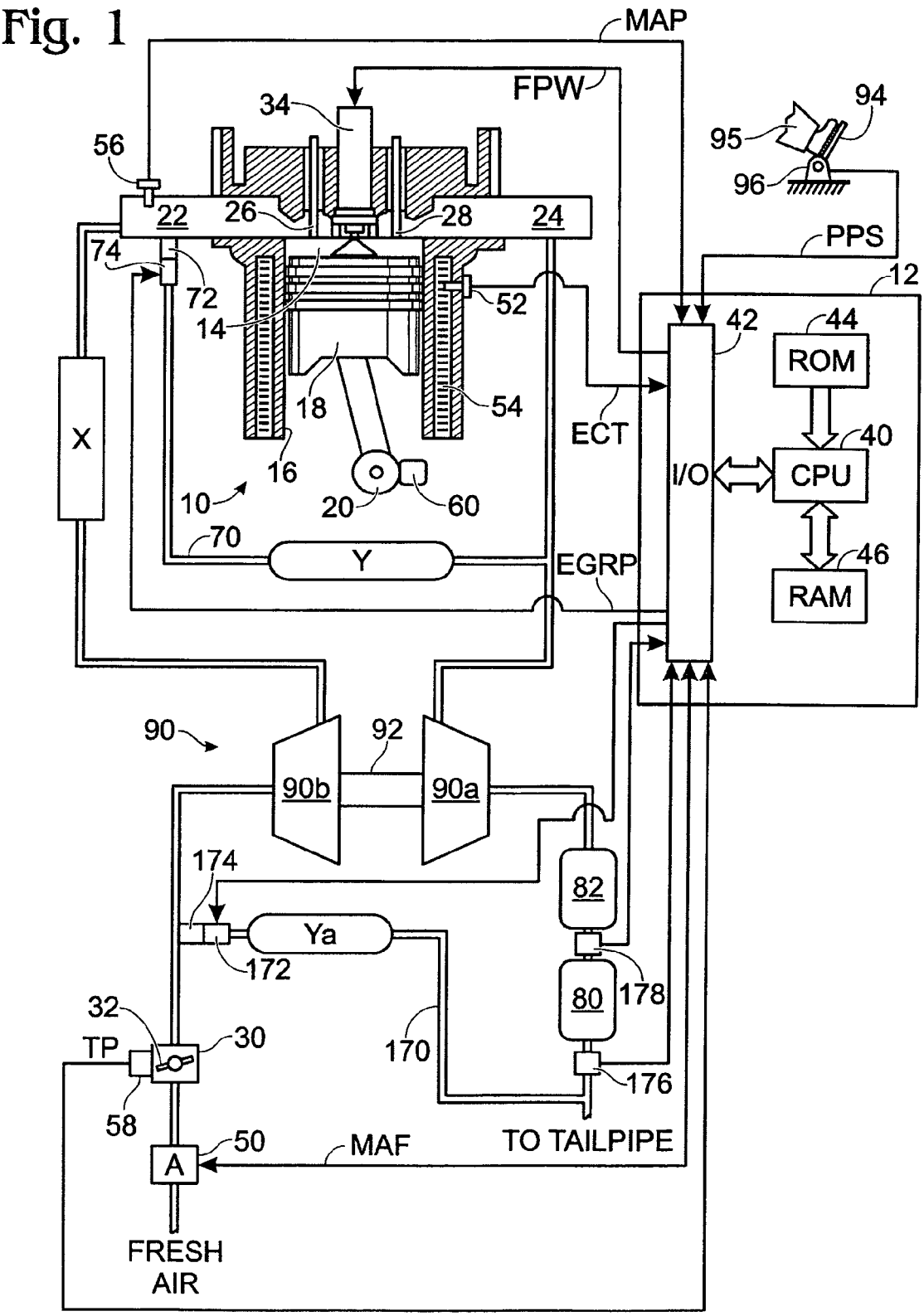
FIG. 1 shows a schematic view of an exemplary embodiment of a diesel engine.

FIG. 1 shows an exemplary embodiment of a diesel engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22. Alternatively, throttle body 30 and throttle plate 32 may be omitted.

Combustion chamber 14 is also shown having fuel injector 34 coupled thereto for delivering fuel in proportion to the pulse width of signal (fpw) from controller 12. Fuel is delivered to fuel injector 34 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc.

In the depicted embodiment, controller 12 is a conventional microcomputer, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass airflow (MAF) from mass airflow sensor 50 coupled to the air filter [A on FIG. 1]; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect (or variable reluctance) sensor 60 coupled to crankshaft 20 indicating engine speed.

Engine 10 may include an exhaust gas recirculation (EGR) system to help lower $NO_x$ and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. The depicted high pressure EGR system includes high pressure EGR valve assembly 72 located in high pressure EGR tube 70. Exhaust gas travels from exhaust manifold 24 first through high pressure EGR valve assembly 72, and then to intake manifold 22. An EGR cooler [shown at Y in FIG. 1] may be located in high pressure EGR tube 70 to cool recirculated exhaust gases before entering the intake manifold. Cooling is typically done using engine water, but an air-to-air heat exchanger may also be used.

Engine 10 may also include a low pressure EGR system. The depicted low pressure EGR system includes a low pressure EGR tube 170 communicating with exhaust manifold 22 at a location downstream of exhaust turbine 90a, and communicating with intake manifold 22 at a location upstream of intake compressor 90b. A low pressure valve assembly 172 is located in low pressure EGR tube 170. Exhaust gas in the low pressure EGR loop travels from turbine 90a through a catalytic device 82 (for example, a diesel oxidation catalyst and/or $NO_x$ trap) and a diesel particulate filter 80 before entering low pressure EGR tube 170. A low pressure EGR cooler Ya may be positioned along low pressure EGR tube 170.

High pressure EGR valve assembly 72 and low pressure EGR valve assembly 172 each has a valve (not shown) for controlling a variable area restriction in high pressure EGR tube 70 and low pressure EGR tube 170, which thereby controls flow of high and low pressure EGR, respectively.

Vacuum regulators 74 and 174 are coupled to high pressure EGR valve assembly 72 and low pressure EGR valve assembly 172, respectively. Vacuum regulators 74 and 174 receive actuation signals from controller 12 for controlling the valve positions of high pressure EGR valve assembly 72 and low pressure EGR valve assembly 172. In a preferred embodiment, high pressure EGR valve assembly 72 and low pressure EGR valve assembly 172 are vacuum actuated valves. However, any type of flow control valve or valves may be used such as, for example, an electrical solenoid powered valve or a stepper motor powered valve.

A particulate sensor 176 may be placed in the exhaust system between particulate filter 80 and the tailpipe to monitor particulate emissions. Likewise, a second particulate sensor 178 may be placed upstream of particulate filter 80. Particulate sensor 178 may be placed either between catalytic device 82 and particulate filter 80 (as depicted), or may be placed upstream of catalytic device 82. Particulate sensor 176 may be referred to herein as "downstream particulate sensor 176" and particulate sensor 178 may be referred to herein as "upstream particulate sensor 178."

Compression device 90 may be a turbocharger or any other such device. The depicted compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used).

Further, drive pedal 94 is shown along with a driver's foot 95. Pedal position sensor (pps) 96 measures angular position of the driver actuated pedal.

Further, engine 10 may also include exhaust air/fuel ratio sensors (not shown). For example, either a 2-state EGO sensor or a linear UEGO sensor can be used. Either of these can be placed in the exhaust manifold 24, or downstream of devices 80, 82 or 90. It will be understood that the depicted diesel engine 10 is shown only for the purpose of example and that the systems and methods described herein may be implemented in or applied to any other suitable engine having any suitable components and/or arrangement of components.

As described above, particulate sensors that are currently used for detecting particulate concentrations in automotive exhaust are generally laboratory grade instruments that may require controlled operating conditions and extensive calibration. As such, these sensors may not be suitable for on-board use in commercially produced automobiles. As an alternative to these laboratory grade sensors, downstream sensor 176 and upstream sensor 178 may be image charge sensors. Image charge sensors are typically used for measuring the presence and/or concentration of solids such as solid chemicals, food products, dust, etc. in a fluid flow, can be manufactured at low cost, and can better survive exposed to the harsh diesel exhaust than currently available laboratory grade exhaust particulate detectors. Furthermore, image charge sensors may require less extensive calibration than laboratory grade sensors. Any suitable image charge sensor may be used as downstream sensor 176 and/or upstream sensor 178. Examples of suitable charge image sensors include, but are not limited to, the PCME DA550 PM particulate matter sensor, available from PCME of Cambridgeshire, UK.

Image charge sensors generally include an electrically conductive body, such as a rod, or a plate, or a probe of other shape, which is insulated from the surrounding environment. The probe is placed in a flow of fluid and develops a time-dependent induced charge caused by a time-dependent flow of charged particles moving in front of the probe in the fluid flow. Such time-dependent charge can be detected by means of a charge amplifier, or similar electronic devices, connected to the probe. It is known that particulate matter flowing directly from the engine tends to have an approximately equal distribution of positively-charged and negatively-charged particles created during the combustion and blow-by process. Therefore, such particulate matter may be difficult to detect with an image charge sensor because the device would need to have a high frequency response. However, a portion of the particulate matter produced by the engine is, over time, deposited on the exhaust system wall, with the largest portion of these deposits upstream of particulate filter 80. During a sudden exhaust flow increase, soot particles are dislodged from the exhaust system walls, thereby temporarily increasing the particulate matter concentration in the exhaust gas. It has been found that the particles detached from the walls are tribologically charged with primarily one polarity of charge, as opposed to the approximately even distribution of charges found in particulate matter flowing directly from the engine. This transient rush of charged particulate matter dislodged from the walls and moving in front of the conductive probe of an image charge sensor inserted in the exhaust gas flow has been found to generate a signal detectable at relatively low frequency.

Figure 2:
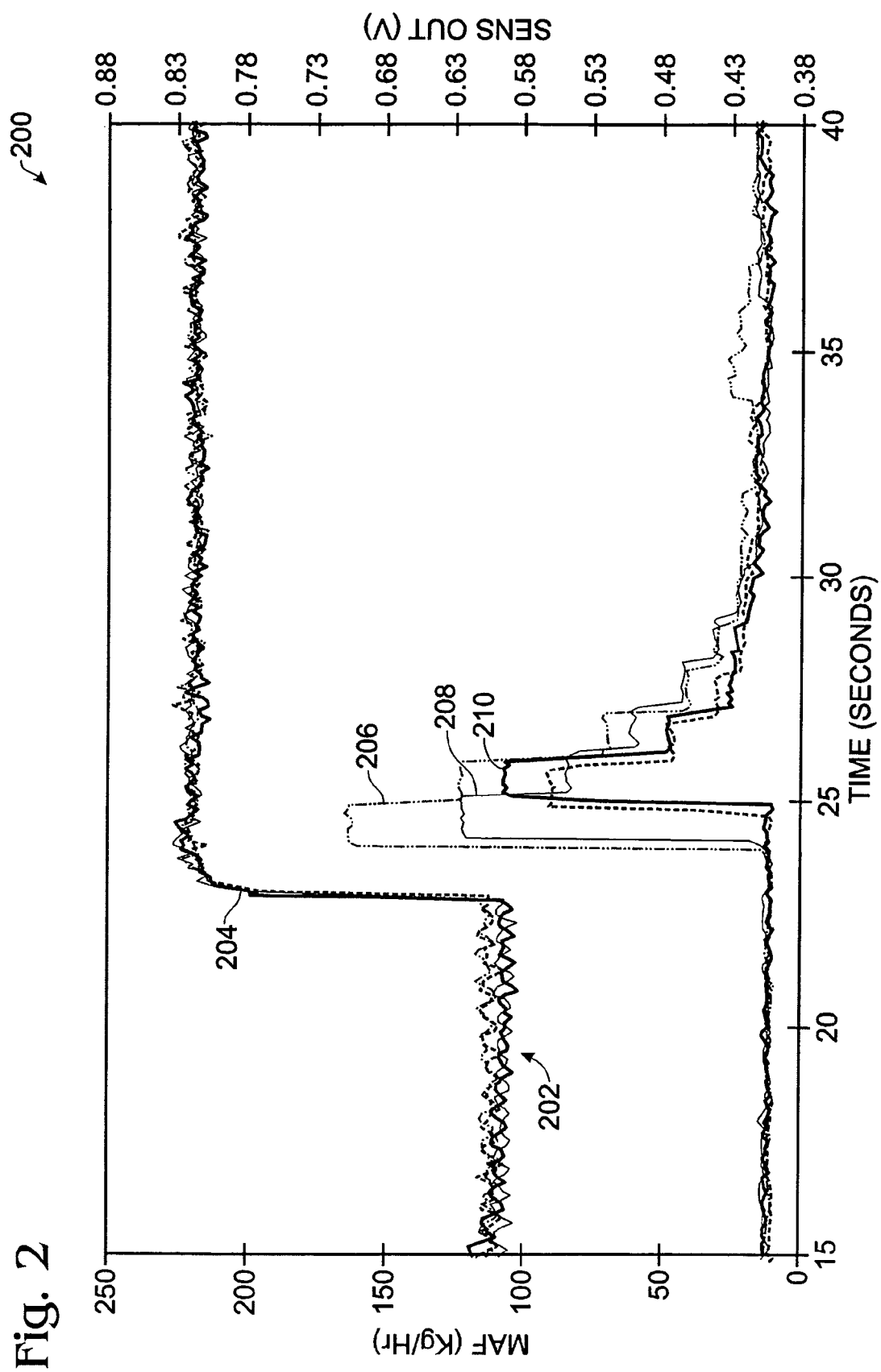
FIG. 2 shows a graphical representation of the output of an image charge sensor with digital output positioned upstream of a particulate filter compared to an input mass air flow as a function of time for a plurality of measurements.

FIG. 2 shows, generally at 200, a plot of the signals from an image charge sensor positioned upstream of a particulate filter and downstream of a plate configured to simulate the blocking effect of a diesel oxidation catalyst on an exhaust flow. The upper set of lines, indicated at 202, show the flow through a mass air flow sensor positioned at the engine intake at an engine-speed/torque of 1000 rpm/200 N*m. The step-like device response is an artifact of the digital signal conditioning of the specific image charge sensor used in the example and is not relevant to the methods taught herein. Each set of flow data shows a sudden increase in mass air flow, indicated at 204, caused by shutting off a flow of EGR to the engine. This also causes an increase in exhaust flow. For example, turning the EGR off reduces the particulate number approximately by 20 times while the mass air flow roughly doubles, with most of the flow change occurring within 0.2 s.

As can be seen in FIG. 2, the increase in mass air flow and exhaust flow is accompanied by a peak in the signal from the image charge sensor, such as that indicated at 206. Any other engine operating parameter indicative of an increase in exhaust flow, including but not limited to pedal position, engine speed, indicated torque, and/or a rate of change of any other suitable engine parameter, can be used as alternative to the mass air flow signal relied upon in this embodiment. The peak in the signal from the image charge sensor is generally asymmetrical, and has a width on the order of 2-3 s at half height. FIG. 2 also shows that similar increases in exhaust flow can be accompanied by signals of different magnitudes from the image charge sensor, as illustrated by the different magnitudes of peaks 206, 208 and 210. Without wishing to be bound by theory, this may be due to different amounts of particulate matter accumulating on the exhaust system wall between different exhaust burst events.

The quantity of particles dislodged from the exhaust system wall per unit time may depend on the rate at which the exhaust flow increases, and/or on the length of time prior to such exhaust transient during which the exhaust flow was relatively constant or decreasing and during which the exhaust flow contained a relatively high soot concentration, which favors soot accumulation on the wall.

FIG. 2 further shows that, under steady state condition (constant exhaust mass flow) the device signal output appears too small to evaluate the correlation between sensor output and particulate matter concentration due to the approximately equal distribution of particles of opposite polarities in the particulate matter flowing directly from engine 10.

The signal from the image charge sensor may rise and decay relatively slowly during a sudden exhaust flow increase event. Therefore, the signal from the image charge sensor may be sampled at a lower frequency compared to a sensor that attempts to detect particles dislodged from the exhaust system wall by a combustion/blow down event (i.e. the combustion and exhaust strokes of the engine). For example, the sensor used to acquire the data shown in FIG. 2 was sampled at a frequency of approximately 10 Hz while the digital signal conditioning of the device was updating at less frequent rate (roughly 1 Hz). This is evidenced by the stair-step shaped decay curve for each sensor signal plot. While the depicted data shows a digital output device with a response time of approximately 1 s, it will be appreciated that any other suitable sampling frequency response time, either greater than or less than 1 s, also may be used.

Figure 3:
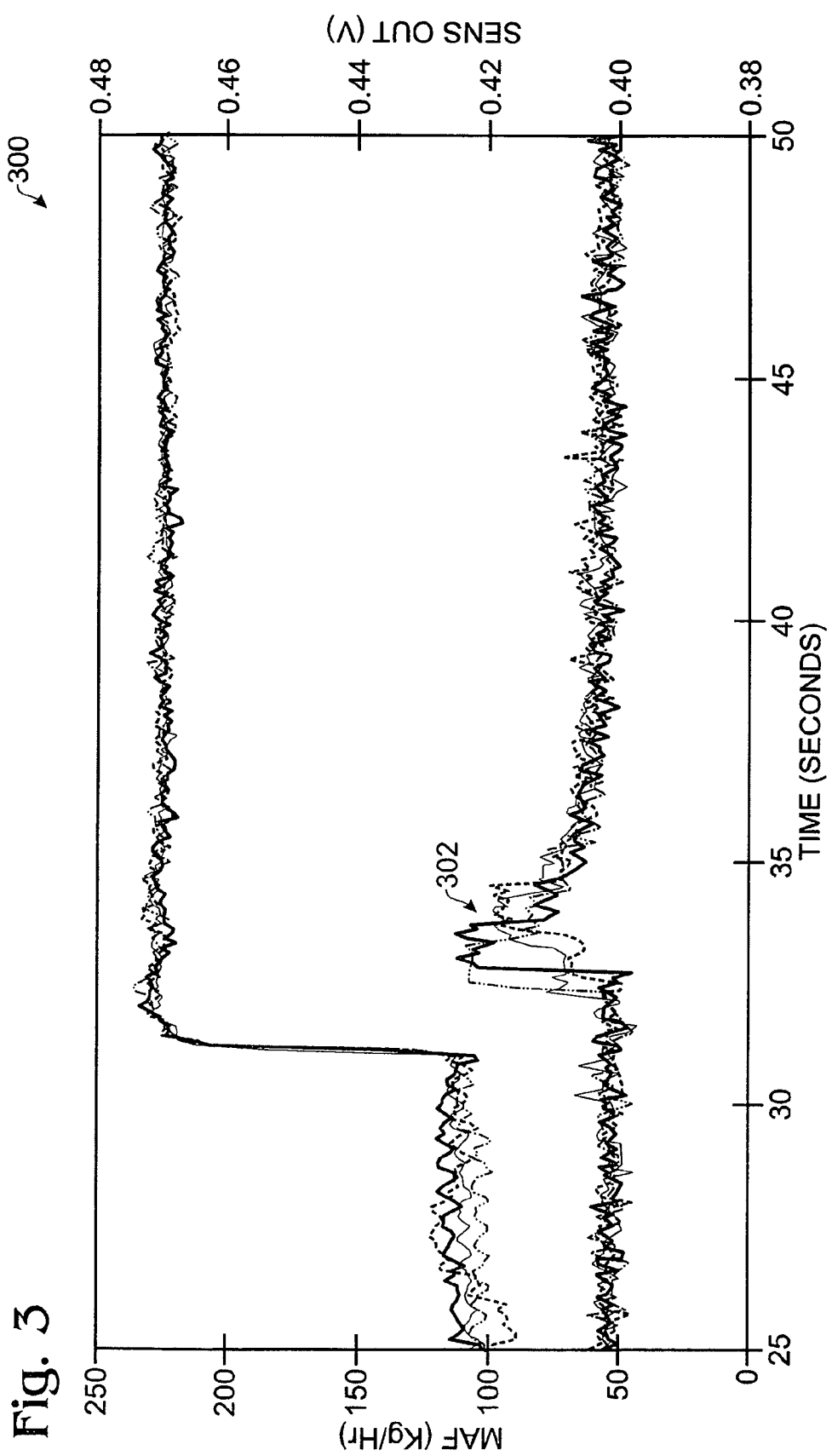
FIG. 3 shows a graphical representation of the output of an image charge sensor positioned downstream of a particulate filter compared to an engine input mass air flow as a function of time for a plurality of measurements.

FIG. 3 shows, generally at 300, a plot of the signals from an image charge sensor positioned downstream of a particulate filter during a sudden exhaust flow increase. It can be seen that the image charge sensor signals associated with the exhaust transient, while attenuated relative to the signals from the upstream image charge sensor shown in FIG. 2, still show significantly stronger peak signals 302 than the level of noise during steady state engine operation. This indicates that the image charge sensor is effective in detecting particulate matter downstream of the particulate filter, and that the sensor is effective in distinguishing different concentrations of particulate matter in the exhaust gas. Particulate matter that passes through the particulate filter may remain charged because the particles do not hit the filter walls, and thus may produce a signal on a sensor positioned downstream of the particulate filter.

Figure 4:
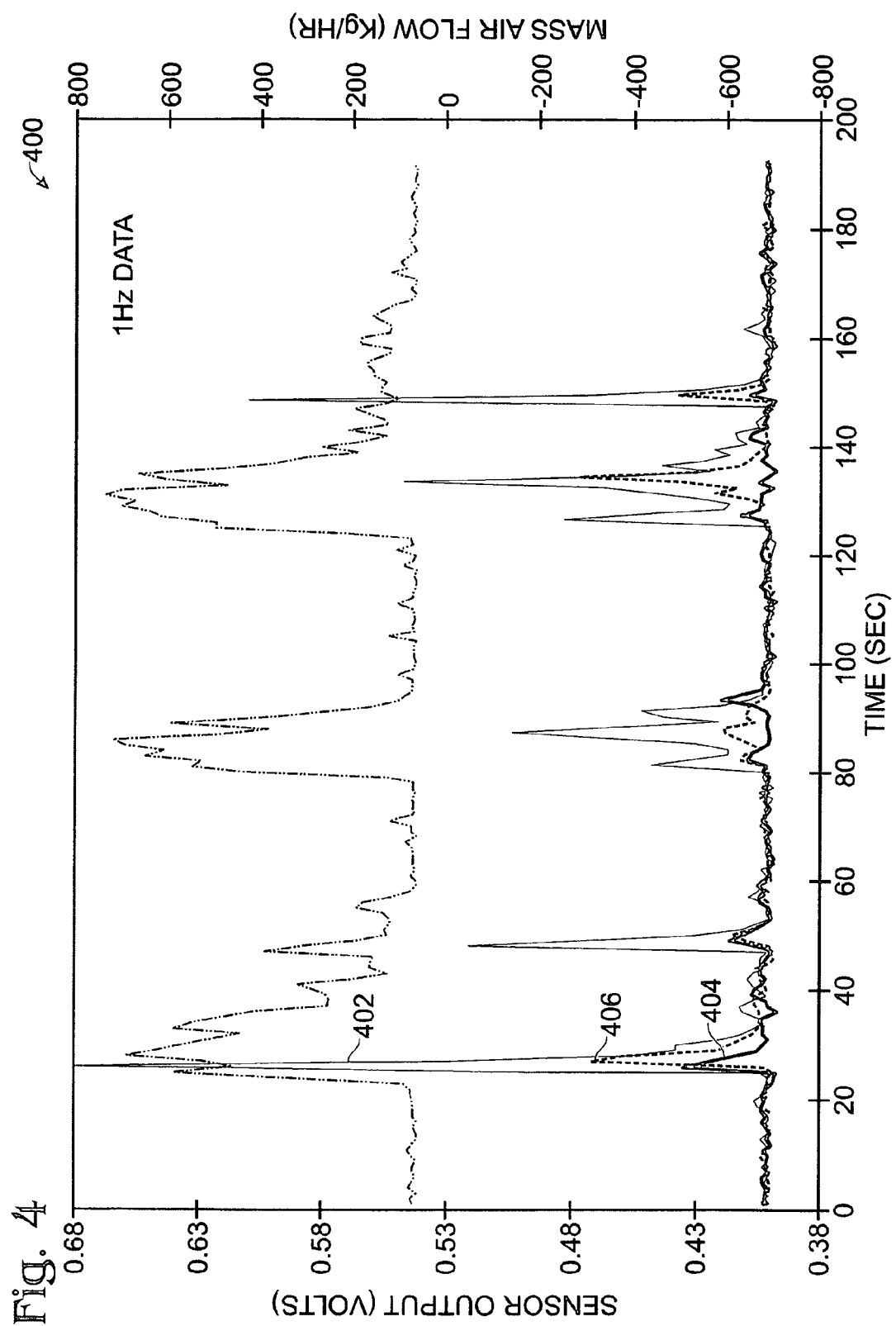
FIG. 4 shows a graphical representation of the outputs of an image charge sensor positioned downstream of a properly functioning particulate filter and an image charge sensor positioned downstream of an improperly functioning particulate filter compared to an engine input mass air flow as a function of time.

FIG. 4 shows, generally at 400, a comparison of a signal from an image charge sensor positioned upstream of a particulate filter 402, a signal from an image charge sensor positioned downstream of a properly functioning particulate filter 404, and a signal from an image charge sensor positioned downstream of a particulate filter 406 that has been artificially deteriorated by creating several flow-through channels (>10% of the wall-flow channels) that have very low trapping efficiency compared to a mass air flow rate as a function of time. The peaks in the mass air flow rate shown in FIG. 4 were produced by laboratory controlled speed/torque transients, which produce much larger changes in exhaust flow than those caused by turning EGR flows on or off. The sensors were sampled at 1 Hz to obtain the data in the sensor response plots.

FIG. 4 shows that the response from the sensor downstream of the partially drilled filter 406 shows a similar, though somewhat attenuated, response as that of the sensor located upstream of the filter 402. On the other hand, the response from the sensor downstream of the properly functioning filter 404 shows an even greater attenuation, which indicates that the tested image charge sensor is capable of detecting a difference between a properly functioning and an improperly functioning particulate filter. FIG. 4 also shows that the response from each image charge sensor is larger during the first speed/torque transient relative to the responses from the other speed/torque transients, possibly due to a larger amount of particulate matter being deposited on the exhaust system wall before the first transient.

Figure 5:
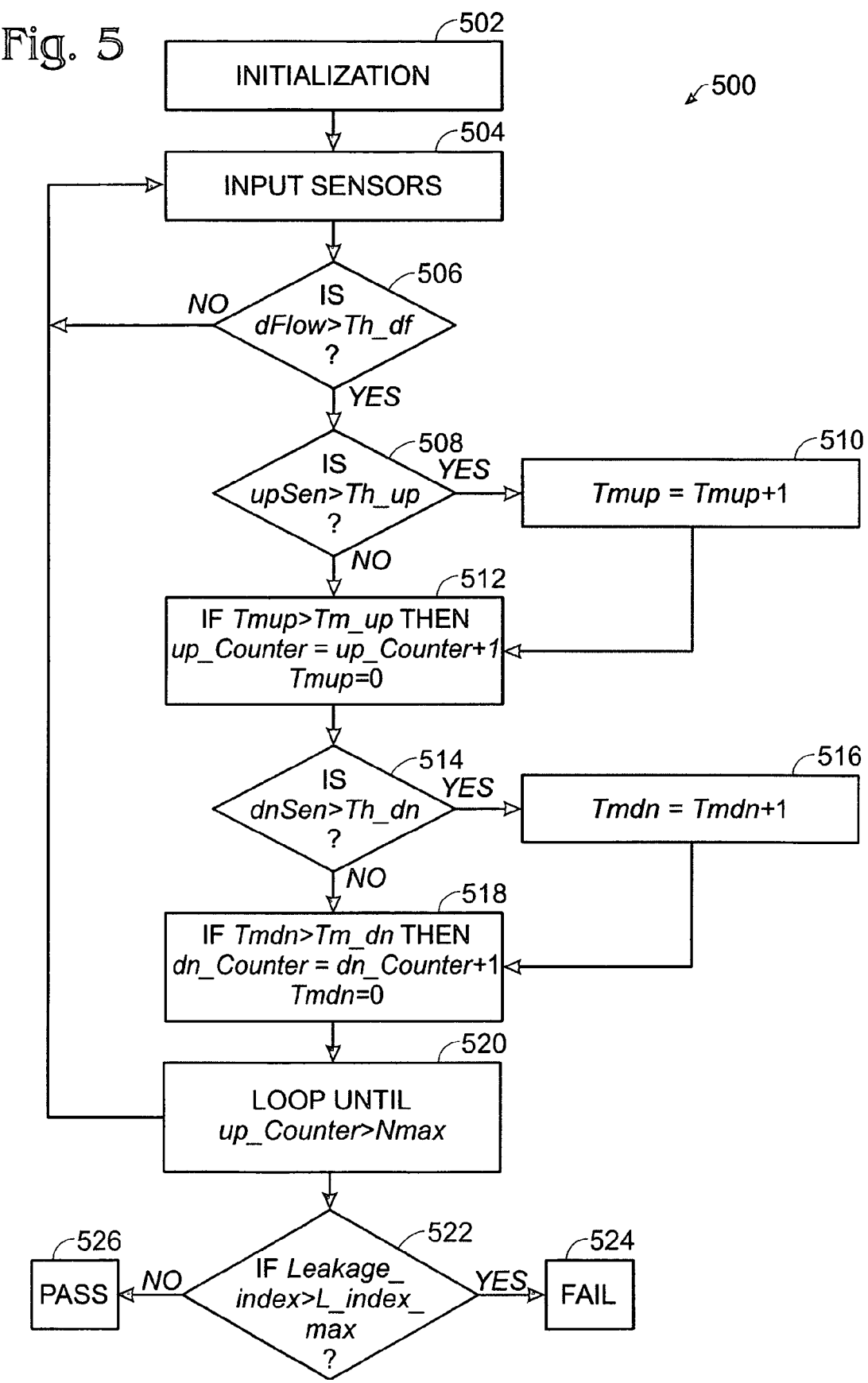
FIG. 5 shows a flow diagram of an exemplary embodiment of a method of monitoring a performance of a particulate filter.

FIG. 5 shows, generally at 500, a flow diagram of an exemplary embodiment of a method of monitoring a performance of an engine exhaust particulate filter. Generally, method 500 infers that the particulate filter trapping efficiency has deteriorated below a certain threshold based on the signals of downstream particulate sensor 176 and upstream particulate sensor 178, as well as on the rate of change of the exhaust flow, which may be directly measured or derived from the engine intake mass air flow and fuel mass injected. The determination is based on a count of charged exhaust particle bursts that produce an image charge signal above a calibratable threshold value in downstream particulate sensor 176 compared to a count of charged particle bursts producing an image charge signal above a calibratable threshold value in upstream particle detector 178, such signals occurring in conjunction with a rapid exhaust flow increase.

More specifically, method 500 first includes, at 502, initializing the counting variables and constants used in the method. Next, at 504, method 500 includes sampling the various engine sensors and inputting the sensor readings into controller 12. After inputting the sensor readings, method 500 next includes determining at 506 whether the exhaust flow is increasing at a rate greater than a predetermined threshold ("Th_df"). If not, method 500 loops back to 504 to again sample and input sensor readings. The comparison of the rate of exhaust flow increase to the threshold value helps to ensure that only those increases in exhaust flow with a high enough rate of change to dislodge significant amounts of particulate matter from the exhaust system walls are used in the particulate sensor diagnostic.

On the other hand, if it is determined at 506 that the exhaust flow is increasing at a rate greater than Th_df, then method 500 includes, at 508, determining whether the signal received from the upstream sensor ("upSen") is greater than a predetermined upstream sensor threshold value Th_up. If the signal upSen is greater than the threshold Th_up, then method 500 includes increasing, at 510, a time counting variable Tmup by a selected value, which is one in the depicted embodiment, and then proceeding to step 512. On the other hand, if the signal upSen is not greater than the threshold Th_up, then method 500 proceeds to step 512 without increasing the timing variable Tmup. The use of the counting variable Tmup allows method 500 to require that the signal from the upstream sensor stay above the threshold sensor value Th_up for a predetermined period of time before using the particulate sensor reading for diagnostic purposes.

At 512, Tmup is compared to a threshold time limit Tm_up. If Tmup is greater than Tm_up (i.e. if sufficient time has passed for the increase in particulate matter to be used for the diagnostic), then a counter variable up_Counter, which used to count a number of particulate matter peaks that have passed the sensor output level threshold Th_up and the time threshold Tm_up, is increased by one. Additionally, the time counting variable Tmup is reset to zero. On the other hand, if Tmup is not greater than the threshold Tm_up, then method 500 eventually cycles back to 502 without increasing up_Counter, and without resetting the time counting variable Tmup.

Any suitable values may be used for the threshold Tm_up and for the initial value of the counter variable Tmup. For example, where the sensor has a sampling rate of approximately 100 ms, Tm_up may have a value of 1 s, and Tmup may have an initial value of 0 s. With these values, an exhaust burst would cause an increase in up_Counter only if the change in exhaust flow and the upstream sensor output stay above the threshold values for one second or more. Furthermore, up_Counter would be increased one additional increment for each additional second these values remain above the threshold values.

Next, similar steps to those performed regarding the upstream sensor are performed regarding the downstream sensor. First, at 514, a signal from the downstream sensor dnSen is compared to a threshold downstream sensor value Th_dn. If the sensor signal dnSen is greater than the threshold Th_dn, then a time counting variable Tmdn is increased by a value of one at 516, and method 500 continues to 518. On the other hand, if the sensor signal dnSen is not greater than the threshold Th_dn, then the counter is not increased. In either case, method 500 next includes comparing, at 518, the time counting variable Tmdn to a predetermined time threshold Tm_dn to see whether the signal dnSen from the downstream sensor has exceeded the threshold Th_dn for a sufficient time to be counted for diagnostic purposes. If so, then a counter variable dn_Counter, used to count a number of particulate matter peaks that have passed the sensor output level threshold Th_dn, and the time threshold Tm_up, is increased by one. On the other hand, if Tmup is not greater than the threshold Tm_up, then method 500 cycles back to 502 without increasing dn_Counter.

Method 500 continues to loop, as indicated at 520, until up_Counter exceeds a predetermined maximum number Nmax, which may be based upon a number of exhaust burst events that is considered to provide sufficient data for the diagnostic. Once up_Counter exceeds Nmax, a ratio (which may be referred to as the "leakage index") of dn_Counter/up_Counter is determined and compared, at 522, to a leakage index threshold that represents a pass/fail threshold for particulate matter performance. If the leakage index is greater than the predetermined leakage index threshold, then, at 524, the particulate filter is determined to have failed. The failure indication signal is then used to activate the Malfunction Indicator Light (MIL). On the other hand, if the leakage index is less than the predetermined leakage index threshold, then the particulate filter is determined to have passed the diagnostic. Method 500 may be performed at any suitable time and may be repeated at any suitable interval.

Method 500 offers the advantage that the diagnostic is not dependent upon precise sensor measurements, but instead merely tests that the signals from the sensors meet various thresholds. Furthermore, the use of up_Counter and dn_Counter to count the number of events that pass the upstream and downstream sensor magnitude and duration thresholds makes the diagnostic less dependent upon the actual sensor readings, which may permit the use of less expensive and simpler sensors such as image charge sensors. Additionally, performing the diagnostic only after sudden increases in exhaust flow allows other spurious signals induced on the sensor to be readily rejected, thereby increasing the detection limit of particles leaked through the particulate filter.

Figure 6:
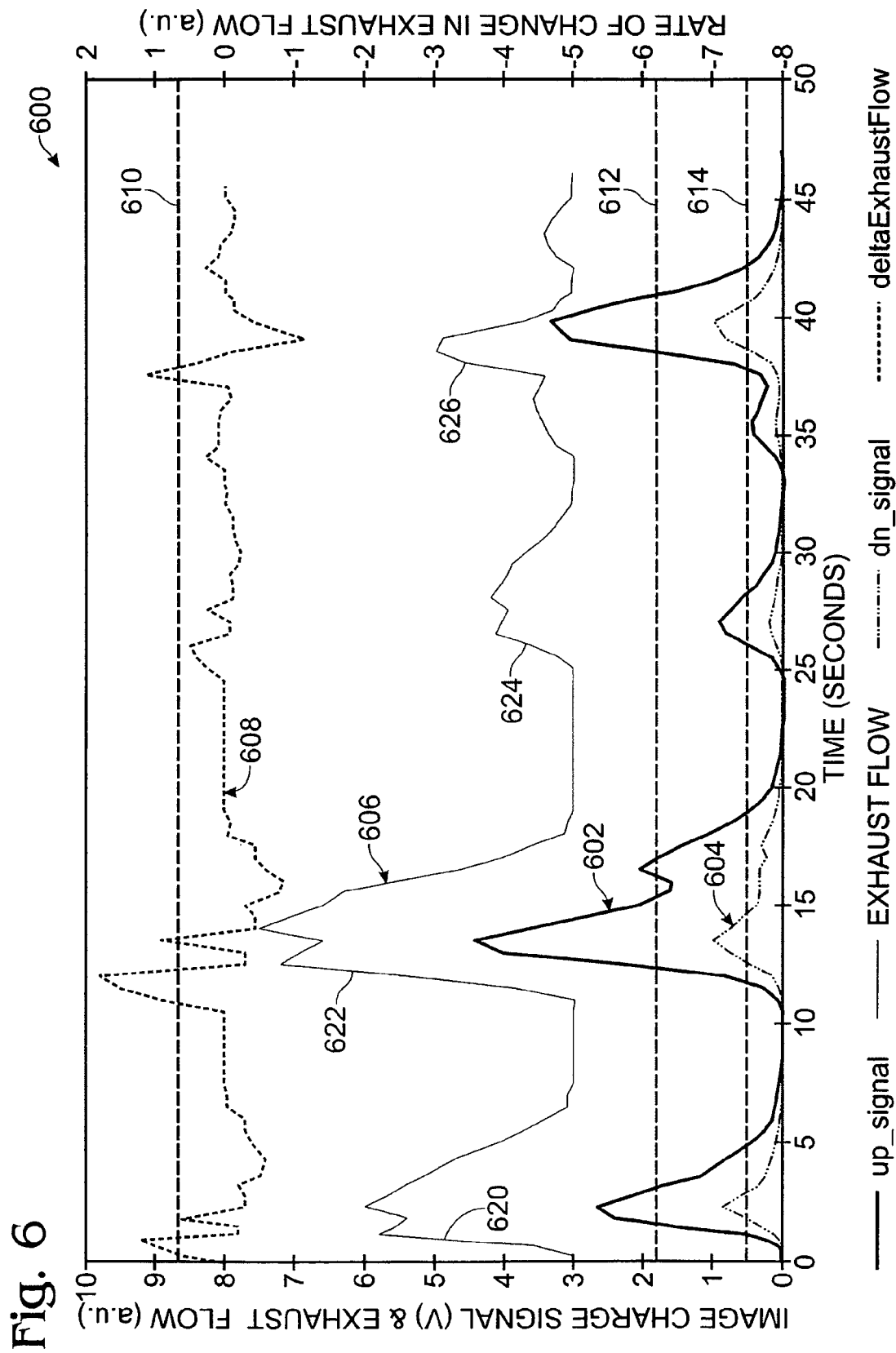
FIG. 6 shows a graphical representation of the outputs of an upstream particulate sensor and a downstream particulate sensor compared to an engine exhaust flow and derivative of the engine exhaust flow as a function of time.

FIG. 6 shows, generally at 600, a schematic representation of a signal from the upstream particulate sensor 602, a signal from the downstream particulate sensor 604, a rate of change in exhaust flow 606, and a derivative of the rate of change of exhaust flow 608 as a function of time. Furthermore, an exemplary value of the flow threshold Th_df is shown at 610, an exemplary value of the upstream sensor threshold Th_up is shown at 612, and an exemplary value of the downstream sensor threshold is shown at 614. Additionally, four exemplary exhaust burst events are shown at 620, 622, 624 and 626. Depending upon the values used for the time thresholds Tm_up and Tm_dn, exhaust flow bursts 620, 622 and 626 may be sufficient to produce an increase in up_Counter and/or dn_Counter. On the other hand, exhaust flow burst 624 has too slow a rate of change to exceed the threshold Th_df, and therefore would not cause an increase in up_Counter and dn_Counter even if the sensor signals are greater than the threshold sensor signal values during the bursts.

Changes in the threshold values may have a relatively large effect on the magnitude of the leakage index determined from up_Counter and dn_Counter. Table I shows a comparison of the number of experimentally controlled exhaust flow increases that triggered particulate matter bursts sufficient to exceed downstream sensor thresholds Th_dn of 0.4 V, 0.42 V and 0.44 V.

TABLE I

| Threshold (V) | Time above threshold | | | Number of peaks above threshold | | |
|---|---|---|---|---|---|---|
| | Pre-filter | Post 50% leaky filter | Post good filter | Pre-filter | Post 50% leaky filter | Post good filter |
| 0.4 | 169 | 157 | 150 | | | 150 |
| 0.42 | 31 | 8 | 2 | 10 | 4 | 1 |
| 0.44 | 20 | 0 | 0 | 9 | 1 | 0 |

As can be seen in Table I, either too high or too low a threshold for the downstream particulate sensor threshold Th_dn may make increase the difficulty of detecting a degraded or failed particulate filter. Therefore, a suitable threshold may be experimentally determined and/or optimized to distinguish between properly functioning and improperly functioning particulate filters. It will be appreciated that the threshold voltages shown in Table I are merely exemplary, and that a sensor may have a different optimum threshold voltage depending upon the sensor construction, the electronics used to amplify and/or process the signal from the sensor, and other such factors.

FIG. 7 shows a schematic view of another embodiment of an engine, generally at 700. Engine 700 includes a single particulate sensor 702 positioned downstream of a particulate filter 704. Because engine 700 includes no particulate sensor positioned upstream of the particulate filter 704, method 500 may not be suitable for use with this engine. Instead, a method may be used that is based upon the signal from particulate sensor 702 and a measure of soot accumulation on the exhaust walls estimated from the length of time prior to the exhaust flow transient that the engine operates in conditions favoring particulate production and at relatively constant exhaust velocity. A pass/fail metric for particulate filter performance may be given by the sum of the integrated sensor output during a flow burst scaled by the soot accumulation before the event, such sum carried out over a calibratable number of events.

FIG. 8 shows, generally at 800, a flow diagram of an exemplary embodiment of a method of monitoring the performance of a particulate filter with a single particulate sensor positioned downstream of the particulate filter. Generally, method 800 includes first estimating or otherwise determining a measure of soot accumulation in the exhaust system upstream of the particulate filter, and then detecting a magnitude of a signal from the downstream particulate sensor upon the occurrence of an increase in a rate of exhaust flow. A performance of the particulate filter may be determined by a comparison of the signal from the particulate sensor and the measure of soot accumulation. It will be appreciated that the specific steps and order of steps shown in FIG. 8 are merely exemplary, and that any other specific steps and/or order of steps may be used.

Method 800 first includes, at 802, initializing variables and constants used in the method, and then, at 804, sampling the various engine sensors and inputting the sampled values into controller 12. Next, an absolute value of the rate of change of the exhaust flow is monitored and compared, at 806, to a first threshold rate of change Th_dfmin. An absolute value of the rate of change of the exhaust flow below Th_dfmin indicates steady state operation. If the absolute value of the rate of change of the exhaust flow is below Th_dfmin, method 800 next includes, at 808, verifying that an event flag that signals an exhaust flow increase event flag is set at 0 (which signifies that no exhaust flow increase event is occurring), and then increasing a soot accumulation counter Soot_acc by a determined amount. The amount that the soot accumulation counter is increased may be determined, for example, from a predetermined mapping of exhaust particulate concentrations as a function of various engine variables. Alternatively, a measure or estimate of the soot accumulation in the exhaust system upstream of the particulate filter may be determined in any other suitable manner.

Method 800 continues to loop through 804, 806 and 808, thereby increasing the soot accumulation total Soot_acc until an increase in exhaust flow is detected. If the absolute value of the rate of change of the exhaust flow is greater than the threshold Th_dfmin, then it is determined, at 810, whether the increase is greater than a second predetermined rate of change threshold Th_df. If the rate of change is greater than the threshold Th_df, this indicates that the rate of change is great enough to cause a burst in exhaust particulate concentration large enough for diagnostic purposes. In this case, method 800 next includes, at 812, changing the exhaust flow increase event flag to a value of 1, and then initializing a timer Tdel to a predetermined value del_th. The function of the timer Tdel is described in below.

After initializing the timer Tdel at 812, method 800 next includes, at 814, determining whether the reading from the particulate sensor located downstream of the particle filter is above a threshold level Sen_th, wherein the threshold level Sen_th represents a threshold, for example, that is sufficiently high to distinguish sensor noise from an increase in particulate matter concentration caused by the increase in the rate of exhaust flow. If the sensor reading is below the threshold level Sen_th, then method 800 loops back to 804. On the other hand, if the sensor reading is above the threshold level, then method 800 next includes, at 816, beginning to integrate the sensor reading as a function of time. This is indicated by the equation Even=Even+sensor(i), wherein the term "Even" represents the integrated signal from the sensor as a function of time, and wherein "sensor(i)" represents the ith incremental sensor reading. Method 800 then continues to loop through 804, 806, 810, 812, 814 and 816 while the rate of change of exhaust flow remains above the threshold Th_df.

At some point, the rate of change of exhaust flow drops below the threshold Th_df. During this transitional period, the absolute value of the rate of change still may remain above the threshold Th_dfmin. Under these conditions, method 800 proceeds through steps 804 and 806 to step 810. At 810, however, if the rate of change of exhaust flow is less than the threshold Th_df, then the status of the event flag ev_flg is determined at 818, and the value of the time counter Tdel is decreased by one if the event flag is equal to 1. Next, it is determined, at 820, if Tdel has been decreased to zero, and if Tdel is not yet zero, then the integration of the sensor reading continues at 816. In this manner, method 800 continues to perform the integration of the signal for a predetermined period equal to del_th after the rate of change of exhaust flow drops below the threshold rate of change Th_df.

Eventually, the time counter Tdel is reduced to a value of zero. Once this occurs, method 800 detects the zero value of Tdel at 820, and then proceeds to 822. At 822, an event counter N_ev is increased by one, indicating that the current exhaust increase event is closed. Next, a leakage index is calculated by dividing the integrated sensor signal (Even) from the closed event by the determined measure of soot accumulation (Soot_ac) existing prior to the beginning of the closed event, and adding this quotient to the total leakage index (Leakage_index). Next, the soot accumulation variable Soot_ac, the signal integration variable Even, and the event flat ev_flg are each reset to zero, and the time counter Tdel is reset to the predetermined initial value del_th. Method 800 then loops, at 824, back to 804 to begin anew. In this manner, method 800 totals the leakage index over a predetermined number N_ev of exhaust rate increase events. Once N_ev reaches a predetermined maximum count, method 800 next includes, at 826, comparing the value of the variable Leakage_index with a predetermined maximum value L_index_max. If Leakage_index is less than L_index_max, this indicates that the particulate filter is performing adequately, as shown at 828. On the other hand, if Leakage_index is greater than L_index_max, this indicates that the particulate filter is not performing adequately, as indicated at 830. Upon determining that the particulate filter is not performing adequately, controller 12 may illuminate a MIL or other such indicator to prompt a user of the automobile to have the particulate filter replaced.

Figure 9:
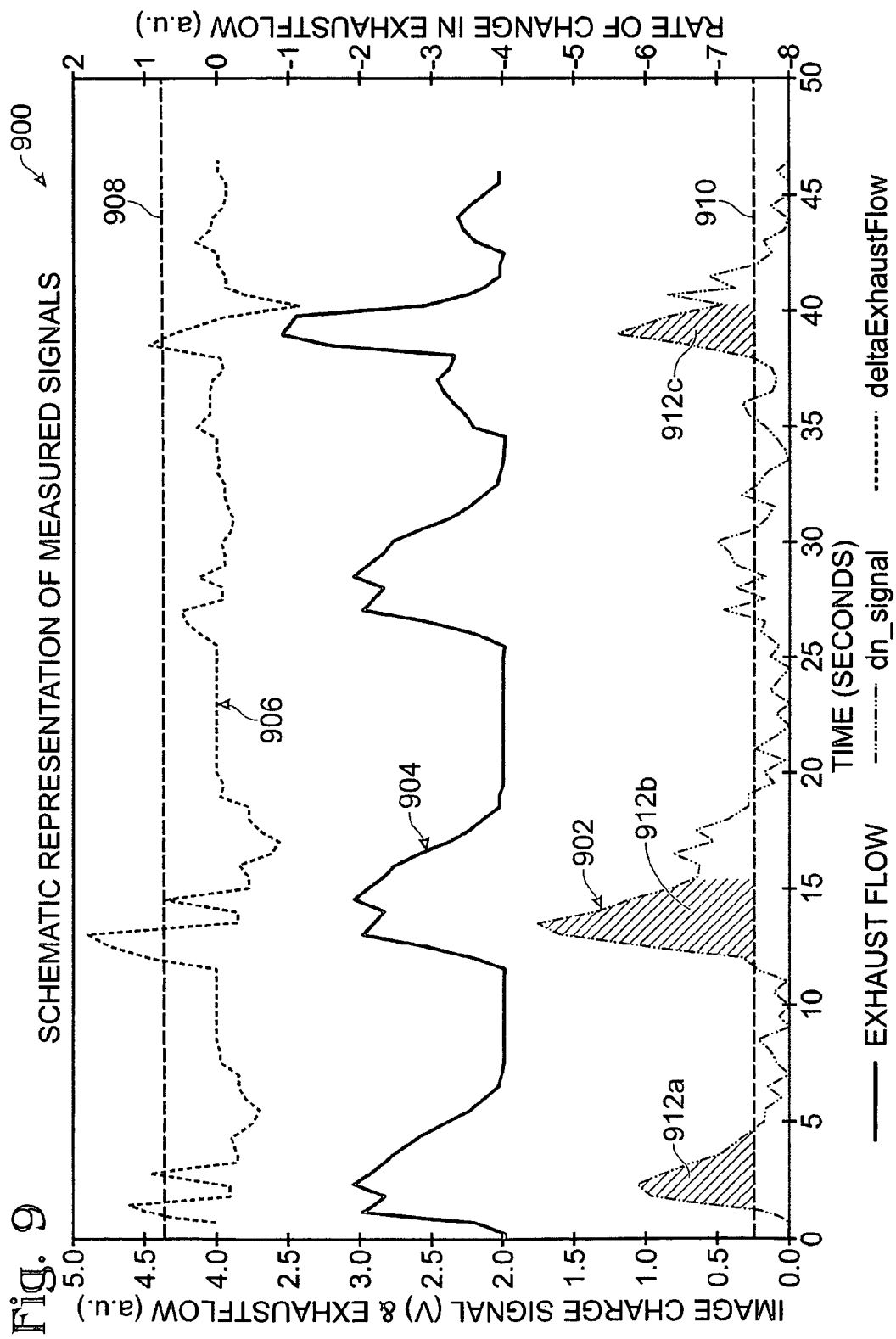
FIG. 9 shows a graphical representation of the output of a downstream particulate sensor compared to an engine exhaust flow and derivative thereof as a function of time.

FIG. 9 illustrates, generally at 900, a schematic representation (at 902) of a signal from the downstream particulate sensor, a rate of change in exhaust flow (at 904), and a derivative of the rate of change of exhaust flow (at 906) as a function of time. Furthermore, an exemplary value of the flow rate-of-change threshold Th_df is shown at 908 and an exemplary value of the sensor threshold sen_th at 910. The areas under the sensor threshold curve that are integrated during the performance of method 800 are shown at 912a, 912b and 912c. First referring to the area 912a, this integration is triggered by an increase in the rate of flow that exceeds rate-of-change threshold 908, and by an increase in the sensor output to a level above sensor threshold 910. The entire area under that portion of the curve that exceeds sensor threshold 910 is integrated, as the time counter Tdel utilized in method 800 continues the integration for a sufficient time period after the increase in the rate of exhaust flow drops below the rate-of-change threshold 908.

Next referring to areas 912b and 912c, it can be seen that only part of the areas under the corresponding exhaust flow peaks that are above the sensor threshold 910 are integrated for each of these areas. This is because the rate of change of exhaust flow drops below rate-of-change threshold 908 and time counter Tdel advances to zero before the sensor output drops below sensor threshold 910. Therefore, as shown in FIG. 9, method 800 integrates the output of the particulate sensor 702 only for the period during and directly after a sudden increase in exhaust flow. Method 800 may continue integrating the particulate sensor output for any suitable interval after the rate of exhaust flow change drops below rate-of-change threshold 908, or may stop integrating at the time the rate of exhaust flow change drops below threshold 908.

The apparatuses and methods described herein may also be used in other applications than monitoring a performance of a particulate filter. For example, the disclosed apparatuses and methods may also be used to perform diagnostics on the operability of the particulate sensors. One example of a method of performing a diagnostic determination on the operability or performance of a particulate sensor or sensors is as follows. First, a measure of a degree of particulate matter accumulation on a wall of the exhaust system upstream of the particulate sensor or sensors may be determined, for example, as described above in regard to processes 804-808 in FIG. 8. Next, an increase in exhaust flow may be detected (directly or indirectly via other engine operating conditions), and the rate at which the exhaust flow increases may be compared to a threshold rate of exhaust flow increase, as described above in regard to process 810 in FIG. 8. If the rate of exhaust flow increase does not meet a predetermined relationship to the threshold rate of exhaust flow increase, then the diagnostic may be deferred until a subsequent exhaust flow increase that meets the predetermined relationship. Any suitable relationship may be used as the predetermined relationship between the determined rate of exhaust flow increase and the threshold rate of exhaust flow increase. Examples of suitable relationships include, but are not limited to, the determined rate of exhaust flow increase being greater than or equal to the threshold rate of exhaust flow increase.

On the other hand, if the rate of exhaust flow increase meets the predetermined relationship to the threshold rate of exhaust flow increase, then an output of the particulate sensor may be compared to a predetermined diagnostic output threshold. If the output of the particulate sensor has a predetermined relationship to a predetermined diagnostic sensor output threshold, then it may be determined that the particulate sensor has degraded, and an alert may be activated to alert a vehicle operator of this condition. On the other hand, if the output of the particulate sensor does not have the predetermined relationship to the diagnostic sensor output threshold, then it may be determined that the particulate sensor has not degraded significantly. Any suitable relationship may be used as the predetermined relationship between the sensor output and the predetermined diagnostic sensor output threshold. Examples include, but are not limited, to, sensor outputs having an absolute magnitude or absolute change in magnitude equal to or below the predetermined diagnostic sensor output threshold. The output of the sensor used in this comparison may be an instantaneous output, an integration of the sensor output over a time interval, engine cycle interval, or other interval, or may be any other suitable representation of the output of the subject sensor.

The threshold rate of exhaust flow increase may have any suitable value. Examples of suitable threshold rates of exhaust flow increase include, but are not limited to, threshold rates of sufficient magnitude to consistently dislodge detectable amounts of particulate from the exhaust system walls. Furthermore, in some embodiments, different threshold rates of exhaust flow increase may be used for different determined measures of particulate matter accumulation on the exhaust system wall upstream of the subject sensor, while in other embodiments, a single threshold rate of exhaust flow increase may be used irregardless of the determined measure of particulate matter accumulation on the exhaust system wall. Where different threshold rates of exhaust flow increase are used for different determined measures of particulate matter accumulation on the exhaust system wall, a table or mapping of a plurality of determined measures of particulate matter accumulation on the exhaust system wall and corresponding threshold rates of exhaust flow increase may be stored in memory on controller 12.

Likewise, the diagnostic sensor output threshold may have any suitable value. Examples of suitable values for the diagnostic sensor output threshold include, but are not limited to, values that may allow for a degree of insubstantial degradation in performance of the subject sensor without triggering an alert. Furthermore, in some embodiments, different diagnostic sensor output threshold values may be used for different determined measures of particulate matter accumulation on the exhaust system wall upstream of the subject sensor, while in other embodiments, a single diagnostic sensor output threshold may be used irregardless of the determined measure of particulate matter accumulation on the exhaust system wall. Where different diagnostic sensor output thresholds are used for different determined measures of particulate matter accumulation on the exhaust system wall, a table or mapping of a plurality of determined measures of particulate matter accumulation on the exhaust system wall and corresponding diagnostic sensor output thresholds may be stored in memory on controller 12.

A sensor diagnostic such as the diagnostic described above may be performed for a sensor positioned either upstream or downstream of a particulate filter. However, where the particulate filter is functioning properly, insufficient particulate matter may reach a sensor positioned downstream of the particulate filter to perform the diagnostic reliably. Therefore, controller 12 may be configured to perform a diagnostic of a sensor positioned downstream of the particulate filter only under conditions during which quantities of particulate matter that are detectable by the downstream particulate sensor are dislodged from the exhaust system walls, for example, after periods during which sufficiently high measures of particulate accumulation on the exhaust system wall are likely to have occurred as determined from engine operating conditions during the period, and/or during periods of sufficiently high exhaust flow rate increase.

The embodiments of systems and methods disclosed herein for monitoring a performance of a particulate filter are exemplary in nature, and these specific embodiments are not to be considered in a limiting sense, because numerous variations are possible. The subject matter of the present disclosure includes all novel and non-obvious combinations and subcombinations of the various particulate sensor and exhaust system configurations, systems and methods for monitoring the performance of the particulate filter via the various particulate sensors, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the various features, functions, elements, and/or properties disclosed herein may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for determining performance of a particulate filter in an exhaust system of an engine, comprising:
   accumulating particulate filter leakage over a predetermined number of exhaust events, the exhaust events comprising a rate of change of exhaust flow exceeding a threshold value, particulate filter leakage based on a particulate sensor located downstream of said particulate filter; and
   assessing particulate filter leakage in response to the accumulated particulate filter leakage, and where, in response to a decrease in the rate of change of exhaust flow to a rate lower than the threshold value, continuing to integrate an output of said particulate sensor for a predetermined interval after the decrease.

2. The method of claim 1, wherein assessing particulate filter leakage includes integrating said output of said particulate sensor.

3. The method of claim 2, wherein integrating said output of said particulate sensor includes integrating said output of said particulate sensor for a predetermined interval after said rate of change of said exhaust flow exceeds the threshold value.

4. The method of claim 2, further comprising determining a measure of particulate matter accumulation in the exhaust system upstream of the particulate filter before detecting an increase in exhaust flow.

5. The method of claim 1, wherein the particulate sensor is a downstream image charge sensor.

6. The method of claim 1, wherein said rate of change of exhaust flow is detected from an engine operating parameter change which is indicative of an increase in exhaust flow.

7. A system, comprising:
   an internal combustion engine;
   an exhaust system for transporting engine exhaust from the engine;
   a particulate filter disposed in the exhaust system;
   a particulate sensor disposed downstream of the particulate filter in the exhaust system, wherein said particulate sensor is an image charge sensor; and
   a controller configured to assess leakage of the particulate filter in the exhaust system in response to a predetermined number of engine operating parameter changes indicative of an increase in exhaust flow in the exhaust system equal to or greater than a threshold rate of change, and in response to an integrated value of an output of said particulate sensor exceeding a threshold value, wherein said controller integrates said output of said particulate sensor over a predetermined period, and wherein said controller further detects when said increase in exhaust flow shifts to a rate lower than said threshold value and continues to integrate said output of said particulate sensor for a predetermined interval after said increase in exhaust flow shifts to said rate lower than said threshold value.

8. The system of claim 7, wherein the controller is configured to determine a measure of particulate matter accumulation in the exhaust system upstream of the particulate filter before detecting said increase in exhaust flow.

9. The system of claim 7, further comprising an upstream particulate matter sensor positioned upstream of the particulate filter.

10. The system of claim 7, wherein said controller detects said increase in exhaust flow by detecting an engine operating parameter change which is indicative of said increase in exhaust flow.

11. A method for determining particulate filter leakage, comprising:
   integrating output of a particulate sensor located downstream of a particulate filter in response to an increase in exhaust flow greater than a threshold rate of change; and
   continuing to integrate the output of the particulate sensor for a predetermined interval after the increase in exhaust flow shifts to a detected rate lower than the threshold rate.

* * * * *